Figures 1, 2:
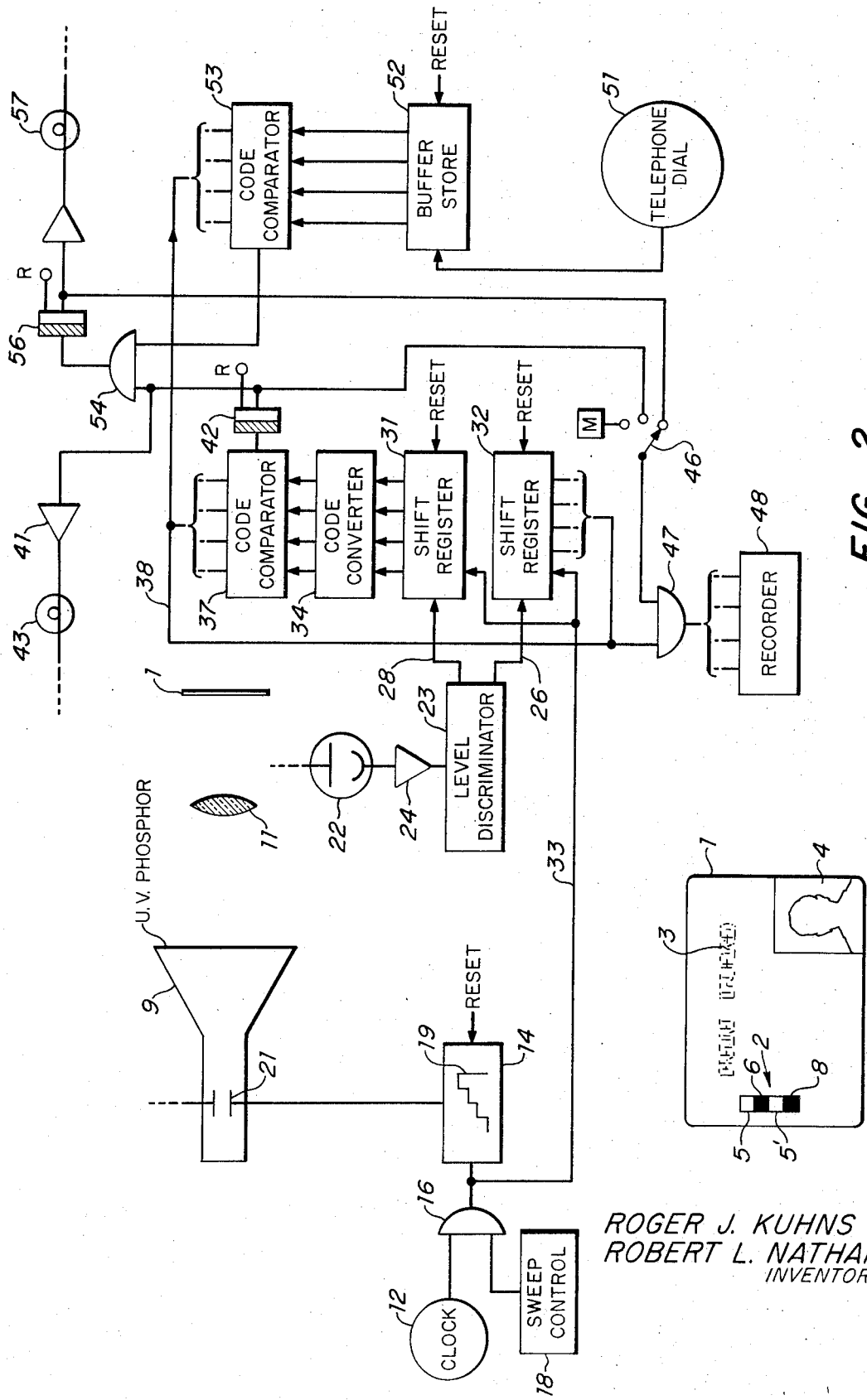

United States Patent
Kuhns et al.

[15] 3,691,350
[45] Sept. 12, 1972

[54] SYSTEM FOR VERIFYING AUTHORIZED USE OF A CREDIT CARD OR THE LIKE

[72] Inventors: Roger J. Kuhns, Tower Rd., Lincoln, Mass. 01773; Robert L. Nathans, 36 Stag Dr., Billericia, Mass. 01821

[22] Filed: July 21, 1970

[21] Appl. No.: 56,771

[52] U.S. Cl..235/61.7 B, 235/61.11 E, 235/61.12 N, 340/149 A, 250/219 I
[51] Int. Cl.......G06k 7/12, G06k 5/02, G06k 19/02, G06n 21/36
[58] Field of Search..235/61.11 E, 61.11 D, 61.11 R, 235/61.12 R, 61.12 N, 61.7 B; 340/149 A, 146.3 RR; 200/46; 250/219 I

[56] References Cited

UNITED STATES PATENTS

| | | | |
|---|---|---|---|
| 3,221,304 | 11/1965 | Enikeieff | 340/149 A |
| 3,430,200 | 2/1969 | Barney | 340/149 A |
| 3,279,826 | 10/1966 | Rodershausen | 235/61.7 B X |
| 3,225,177 | 12/1965 | Stites | 235/61.11 E |
| 3,445,633 | 5/1969 | Ratner | 235/61.7 B |
| 3,513,298 | 5/1970 | Riddle | 235/61.11 D |
| 3,444,517 | 5/1967 | Rabinow | 340/146.3 B |
| 3,536,894 | 10/1970 | Travioli | 235/61.6 R |

*Primary Examiner*—Maynard R. Wilbur
*Assistant Examiner*—Robert M. Kilgore
*Attorney*—Robert L. Nathans

[57] ABSTRACT

A system is disclosed for machine scanning a first and second set of identification indicia recorded upon a credit card or the like wherein said first set of identification indicia is visible to the human eye and a second set of identification indicia is invisible to the human eye. Circuitry is provided for comparing the visible and invisible sets of identification indicia to determine whether or not they correspond, lack of correspondence thereof indicating the possible presence of a counterfeited card. Further circuitry is provided for having a bank teller, for example, manually insert the card holder's identification number, which is orally transmitted to the teller by the card holder, into the system whereby the manually inserted identification number is compared with the machine scanned coding associated with the card. If all three codes correspond, it is extremely unlikely that unauthorized use of the credit card is occurring or that coded indicia has been misread by the scanner.

9 Claims, 2 Drawing Figures

ROGER J. KUHNS
ROBERT L. NATHANS
INVENTORS.

SYSTEM FOR VERIFYING AUTHORIZED USE OF A CREDIT CARD OR THE LIKE

BACKGROUND OF THE INVENTION

It is believed that the machine reading of credit cards or the like will be carried out in the future with respect to automated debiting in banking systems or the like. Machine reading of coded cards has already been performed for other uses such as card holders obtaining access to restricted areas in a manufacturing facility.

Besides the problem of reliability in machine scanning, the problem of unauthorized use of cards by individuals other than bona fide card holders is a very serious one. Obviously, the use of a credit card for automatic debiting of accounts by an unauthorized individual could be so disastrous as to preclude automatic debiting systems from attaining wide-spread use. Copying or fabricating of coded cards by counterfeiters must be thwarted. Likewise, consistent, accurate, and reliable reading of coded indicia is obviously of extreme importance in order to debit the proper account. In many applications this verification process must be done "off line" by a self-contained and decentralized technique.

SUMMARY OF THE INVENTION

In accordance with one embodiment of the invention, a credit card or the like is coded with a first set of identification indicia visible to the human eye and is coded with a second set of identification indicia invisible to the human eye. The two sets of identification indicia are scanned, detected and compared with each other. If a counterfeiter is deluded into believing that the visible code markings constitute all of the identification indicia, and thus does not record an invisible set of indicia, the system will not accept use of the card by a counterfeiter. The invisible set of identification indicia preferably is coded differently than the visible identification indicia to further thwart a counterfeiter who does not understand the conversion scheme linking the two codes. In accordance with another embodiment of the invention, at least one of the aforementioned codes recorded upon the card is compared with identification indicia which is manually inserted into the system by a bank teller, for example. If the manually inserted indicia, orally transmitted to the teller by the cardholder, does not correspond to the machine read indicia produced by scanning the card, the system will also reject the card and thus prevent automatic debiting. In this instance it is possible that a counterfeiter could code the card, especially where the card is only coded with visible indicia, and yet would not be able to inform the teller as to what the proper identification number is.

Other objects, features and advantages of the invention will become apparent upon perusal of the foregoing specification taken in conjunction with the drawings in which:

FIG. 1 discloses a coded credit card or the like;

FIG. 2 discloses a schematic diagram of a preferred embodiment of the invention.

SPECIFIC DESCRIPTION OF THE INVENTION

Referring now to FIG. 1, a credit card or the like 1 is disclosed having a coded portion 2 thereon together with lettering 3 and an optional photo 4 of the cardholder. The coded portion 2 preferably includes black and white markings which correspond to binary ones and zero, which markings are visible to the human eye. The coded portions are illustrated as having four bit positions which in the conventional binary code could represent 16 numbers or characters. However, in practice, the code portion 2 could include further bits to accommodate more characters such as the alphabet. A four-bit code is illustrated for simplicity. Black marks 6 and 8 preferably represent a binary 0 whereas white areas 5 and 5' preferably represent a binary 1. Bits 5 and 5' besides being represented by an unmarked clear area might also contain fluorescent material which fluoresces upon exposure to ultraviolet radiation, whereas opaque bits 6 or 8 preferably do not contain such fluorescent material. For example, the white and black marks would represent, from top to bottom, a binary 1010, for example, whereas the marking of the third bit 5' only with fluorescent material provides another code, e.g., 0010. We therefore have created two separate binary codes within the single coded portion 2 of the card, one being visible to the naked eye and one being invisible to the naked eye. As mentioned hereinabove, combining a visible and invisible code within a single code portion tends to mislead a counterfeiter into thinking that no invisible code exists.

A cathode ray tube 9 is positioned to scan card 1 with a spot of light which is focused upon the coded portion of the card by lens 11. Tube 9 has a phosphor face which produces light having a large quantity of u.v. light generated along with an appreciable quantity of visible light. Clock 12 which produces a pulse train is coupled to a conventional staircase generator 14 through AND gate 16. Sweep control circuit 18 applies an enabling mark to AND gate 16 upon the commencement of scanning which results in the production of a staircase wave 19 which in turn is applied to vertical deflection plates 21 to cause the spot to vertically scan code portion 2, as is well understood by those skilled in the art. The phosphor screen of cathode ray tube 9 is provided to generate the aforesaid mixture of u.v. and visible light. RCA 5WP15 or 5ZP16 has such a screen.

A photocell or photomultiplier tube 22 is positioned adjacent card 1 and is coupled to a conventional level discriminator 23 via amplifier 24. When the spot scans the upper most bit shown in FIG. 1, sufficient light is reflected from the upper most white bit so that discriminator 23 produces a mark on "white" lead 26. If the first bit merely had an opaque mark therein, no mark would be produced on lead 26. When the scanning spot covers bit 6 such a no-mark condition exists. When the scanning spot reaches the third bit 5' which contains white fluorescent material, the third bit position will glow due to the u.v. present in the scanning spot and thus, unlike the aforementioned first bit, a greater intensity of light will be directed to the photocell so that the level discriminator produces a mark on glow lead 28 but does not produce a mark on white lead 26. As is well understood by those skilled in the art, an output mark on the glow lead could activate and inhibit gate within discriminator 23 so that a mark is not produced on lead 26. When the spot reaches bit 8, little light will reach photocell 22 and a no-mark condition is present on conductors 26 and 28. Since the clock pulses applied to staircase generator 14 are also applied to shift registers 31 and 32 via lead 33, a 1010 code will be inserted into shift register 32 whereas an 0010 code will be inserted into shift register 31. Accordingly, the use of a three-voltage level discriminator and a pair of shift registers causes the insertion of two different superimposed codes within the registers. Code converter 34 may be merely a matrix of diodes which converts the "glow" code into its equivalent in the "visible" code and thus a glow code of 0010 would be converted by code converter 34 into a 1010 code which is applied to a first code comparator 37 as shown. The 1010 code in shift register 32 would also be applied to comparator 37 via lead 38. In the event that the card is properly coded with the glow code and the visible code, a mark will be produced at the output of comparator 37 to set flip-flop 42 to cause bulb 43 to be energized via amplifier 41. Should a counterfeiter present an improperly marked card, flip-flop 42 would not be set and bulb 43 would not be lit and the bank teller, for example, would be warned of the presence of the counterfeit card. After this cycle is completed, all circuits would be reset as is well understood by those skilled in the art. The actuation of flip-flop 42 would, if switch 46 is in the middle position, enable AND gate 47 which would transfer the contents of shift register 32 into recorder 48. If flip-flop 42 has not been actuated due to the presence of a defective card, no recordation is made of the number on the card; accordingly, no debit is recorded. The u.v. coding may be done by machine or manually by a u.v. brush pen or u.v. carbon paper.

An additional feature of the invention enables the bank teller, for example, to manually dial or punch in the cardholder's social security number which is obtained from questioning a customer. Telephone dial 51 is coupled to buffer store 52 which stores the number dialed in by the teller. A second code comparator 53 compares the dialed-in number with the "glow" code and with the visible code. If all three codes are equivalent, AND gate 54 is enabled to set flip-flop 56 which in turn causes lamp 57 to glow. In this mode of operation, switch 46 assumes the lower position as shown and the setting of flip-flop 56 enables AND gate 47 so as to transfer the contents of shift register 32 into recorder 48. In this mode of operation, if the counterfeiter properly marked the card with the two correct sets of codes, but did not orally transmit the correct code to the teller, the debit would not be entered into recorder 48 because AND gate 54 would not be fully enabled due to the generation of a no-mark condition by code comparator 53.

If switch 46 assumes the upper position, the system could be utilized to merely scan a visible conventional code and insert it into recorder 48 since the upper terminal of switch 46 always produces a marking voltage to continually enable AND gate 47 in this mode of operation.

The aforementioned verification systems can also be used to activate other devices than a "go-no-go" indicator as entry doors, money, dispensors, etc.

Obviously many modifications and variations of the present invention are possible in the light of the above teachings. It is therefore to be understood, that within the scope of the appended claims, the invention may be practiced otherwise than as specifically described.

We claim:
1. A system for reading a first coded set of coded identification indicia visible to the human eye associated with a credit card or the like and for reading a second set of identification indicia which is invisible to the human eye and which is associated with a credit card or the like and for varifying authorized use thereof comprising:
  means for scanning said first and second coded sets of identification indicia with a spot of light;
  a transducer positioned adjacent said credit card or the like for converting light intensity emanating from said card as said coded sets of identification indicia are scanned into signals corresponding to said light intensity;
  a three-level discriminator coupled to said transducer for producing a first electrical signal when said spot of light is congruent with an opaque bit upon said credit card or the like, for producing a second electrical signal when said spot of light is congruent with a non-opaque bit and for producing a third electrical signal when said spot of light is congruent with a bit position which fluoresces in response to being struck by said spot of light;
  first storage means coupled to said three-level discriminator for storing said first coded set of identification indicia read off of said credit card or the like;
  second storage means coupled to said three-level discriminator for storing said second coded set of identification indicia associated with said credit card or the like; and
  first comparator means coupled to said first and second storage means for indicating whether or not the coded sets of identification indicia stored within said first and second storage means correspond with each other.

2. The combination as set forth in claim 1 wherein said means for scanning comprises a flying-spot scanner including a cathode-ray tube having a face plate which emits visible and ultraviolet radiation upon being bombarded with electrons focused upon said screen by said cathode ray tube.

3. The combination as set forth in claim 1 further including insertion means for manually inserting a third coded set of identification indicia obtained from the holder of said credit card or the like into said system;
  third storage means coupled to said insertion means for storing said third coded set of identification indicia therein;
  second comparator means coupled to at least one of said first and second storage means and to said third storage means for indicating whether or not said third coded set of identification indicia corresponds to at least one of said first or second sets of identification indicia read off of said credit card or the like by said scanning means.

4. The combination as set forth in claim 3 further including a recording device, and means coupled to at least one of said first, second and third storage means for transferring the contents therein into said recorder only if the third set of identification indicia inserted into said system by said insertion means corresponds to at least one of said first or said second sets of identification indicia.

5. A system for reading a first coded set of coded identification indicia visible to the human eye associated with a credit card or the like and for reading a second set of identification indicia which is invisible to the human eye and which is associated with a credit card or the like and for varifying authorized use thereof comprising:

means for scanning said first and second coded sets of identification indicia with a spot of light;

a transducer positioned adjacent said credit card or the like for converting light intensity emanating from said card as said coded sets of identification indicia are scanned into signals corresponding to said light intensity;

a three-level discriminator coupled to said transducer for producing a first electrical signal when said spot of light is congruent with an opaque bit upon said credit card or the like, for producing a second electrical signal when said spot of light is congruent with a non-opaque bit and for producing a third electrical signal when said spot of light is congruent with a bit position which fluoresces in response to being struck by said spot of light; and first comparator means coupled to said discriminator for indicating whether or not both coded sets of identification indicia correspond with one another.

6. The combination as set forth in claim 5 wherein said means for scanning comprises a flying-spot scanner including a cathode-ray tube having a face plate which emits visible and ultraviolet radiation upon being bombarded with electrons focused upon said screen by said cathode-ray tube.

7. The combination as set forth in claim 5 further including insertion means for manually inserting a third coded set of identification indicia obtained from the holder of said credit card or the like into said system;

second comparator means for indicating whether or not said third coded set of identification indicia corresponds to at least one of said first or second sets of identification indicia read off of said credit card or the like by said scanning means.

8. The combination as set forth in claim 7 further including a recording device and means for inserting said first, second or third coded sets of identification indicia into said recorder only if the third set of identification indicia inserted into said system by said insertion means corresponds to at least one of said first or said second sets of identification indicia.

9. A system for reading a first coded set of coded identification indicia visible to the human eye associated with a credit card or the like, and for reading a second coded set of identification indicia which is invisible to the human eye and which is associated with a credit card or the like, and for verifying authorized use thereof comprising:

a. means for illuminating said first and second sets of coded identification indicia with light;

b. means for reading said first and second coded sets of identification indicia, including transducer means for converting light intensity emanating from said card as said coded sets of indicia are read into signals corresponding to said light intensity;

c. a three-level discriminator means coupled to said transducer means for producing a first electrical signal when an opaque bit upon said credit card is being read, for producing a second electrical signal when a non-opaque bit upon said credit card is being read, and for producing a third electrical signal when a bit upon said credit card is being read which fluoresces in response to being struck by said light;

d. first storage means coupled to said three-level discriminator for storing said first coded set of identification indicia read off of said credit card;

e. second storage means coupled to said three-level discriminator for storing said second coded set of identification indicia read off of said credit card; and f. comparator means coupled to said first and second storage means for indicating whether or not the coded sets of identification indicia stored within said first and second storage means correspond with each other.

* * * * *